United States Patent [19]
Robinson

[11] 3,953,012
[45] Apr. 27, 1976

[54] TORSIONAL EXTRUSION ENERGY ABSORBER OR EXTRUSION TORQUE LIMITER

[75] Inventor: William Henry Robinson, Wellington, New Zealand

[73] Assignee: New Zealand Inventions Development Authority, Wellington, New Zealand

[22] Filed: Nov. 11, 1974

[21] Appl. No.: 522,838

[30] Foreign Application Priority Data
Nov. 21, 1973 New Zealand ............... 172665

[52] U.S. Cl. ................................ 267/154; 267/57
[51] Int. Cl.² ......................................... F16F 1/14
[58] Field of Search ....................... 267/154, 57

[56] References Cited
UNITED STATES PATENTS
2,751,217 6/1956 Thompson ................. 267/57
3,545,737 12/1970 Lamprey ................. 267/154

*Primary Examiner*—James B. Marbert
*Attorney, Agent, or Firm*—Ladas, Parry, Von Gehr, Goldsmith & Deschamps

[57] ABSTRACT

This instrument can fulfil two purposes. It can be a torque limiter which transmits torque up to a limit set by design, without slip. At higher values of torque it behaves as an absorber of energy. It can be cyclic or unidirectional or impact in operation. It can be applied as an absorber of wind or earthquake forces, as a buffer or fender in a transport system, as a brake, or as a torque limiter in a shaft transmitting power. Its commonest form is an eccentric within a cylinder, the intervening space being filled with a material capable of spontaneous recovery and recrystallisation at the working temperature.

8 Claims, 6 Drawing Figures

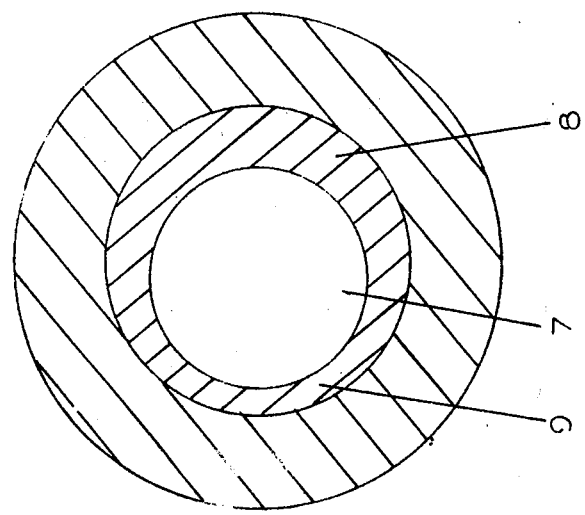
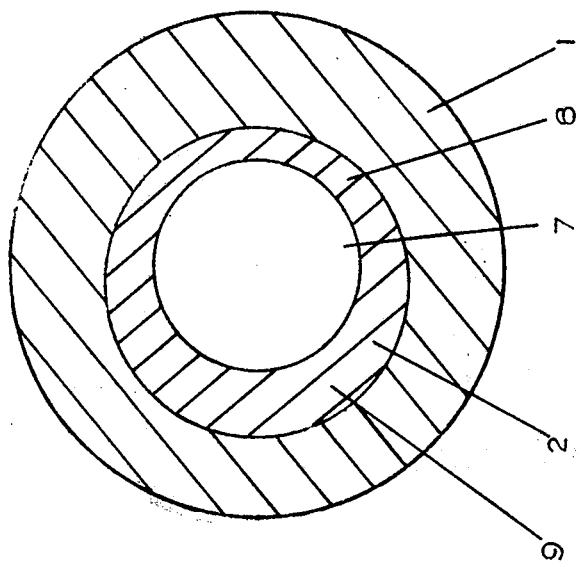

TORSIONAL EXTRUSION ENERGY ABSORBER OR EXTRUSION TORQUE LIMITER

This invention relates to a torsional extrusion energy absorber or extrusion torque limiter.

Torque limiters are well-known. It is common to couple a shaft rotated by a source of power to a shaft which drives an appliance by way of a clutch which is designed to transmit only a predetermined torque. In doing this it is a torque limiter. Some such devices are exact, expensive and cumbersome, others are simple but not totally repetitive in their action. The surfaces which must transmit torque up to the permitted limit must clearly have considerable friction. When those surfaces rotate relatively in the slipping phase they may be polished so that the torque at which they next begin to slip is reduced. Also, existing devices are commonly designed to carry out only the one function of transmitting a limited torque.

The present invention does not rely on friction or on complex devices, but on the properties of matter. If, on a number of successive single occasions, an excess torque is demanded, the torque at which the slip first occurs will be approximately the same on each occasion. In addition, the present invention is designed to operate as an energy absorber. For instance, one member could be affixed to a fly-wheel which was required on occasion to slow down; another member could be capable of being locked stationary on demand. The device would then act as a brake. In another manifestation one member could be held stationary while the other was coupled by an arm to a source of energy which it was required to absorb. That energy could be absorbed whether it was uni-directional or cyclic. Furthermore, the last modification could have attached to it a ratchet so that when the arm was moved in one direction, energy was absorbed, and in the other direction, it could move freely.

In a particular application of the invention as an energy absorber, it is intended to protect structures such as tall buildings from damage by earthquake or high winds. The device is installed so that it connects together two parts of the structure which are caused by the incoming energy to move relative to each other. The energy which would otherwise do damage is then absorbed by this device, which is proposed as a very much cheaper alternative to building energy absorbing components into the structure.

It is therefore an object of the present invention to provide a torsional extrusion energy absorber or extrusion torque limiter which will go some way to overcoming the difficulties of existing torque limiters and energy absorbers, and will have additional advantages, or will at least provide the public with a useful choice.

Accordingly, the invention consists in a torsional extrusion energy absorber or extrusion torque limiter to be interposed between members of a structure, said absorber or limiter comprising a driving and a rotatable driven member connected together by extrudable material which can be extruded by operation of the driven member and is a crystalline substance which at the operating temperature of the absorber or limiter operating in the absorber mode is capable of spontaneous recovery and recrystallisation to regain its original mechanical properties.

In a further embodiment the invention consists of a bi-modal device comprising an outer cylinder, an eccentric adapted to rotate within the cylinder and about its axis, seals to confine an annular space between the eccentric and the cylinder, a crystalline material filling said space, such material being extrudable and capable of spontaneous recovery and recrystallization at the working temperature and within the period of cyclic operation of the device wherein below a predetermined torque applied between the cylinder and the eccentric, the device rotates in a first mode as a whole and that above the said predetermined torque the eccentric, in a second mode, rotates within and extrudes the said material.

Preferably the absorber or limiter is so designed that the extrusion torque is constant throughout the revolution of the eccentric and is independent of direction of rotation of the eccentric relative to the cylinder, thus giving a rectangular torque/rotation hysteresis loop enabling a maximum amount of energy to be absorbed for a given torque and rotation.

The invention consists in the foregoing and also envisages constructions of which the following gives examples only.

This energy absorber and torque limiter is an extruder in which, up to the limit of torque predetermined by design, there is no relative rotation between the parts and, hence, no extrusion. At higher values of torque, i.e. in the absorber mode, either an orifice moves through the extruded material or the extruded material moves through the orifice. In general, the extrusion of a crystalline material produces severe plastic deformation, in which the original relatively spheroidal grains (or crystals) become elongated and now contain stored energy in the form of crystal defects. This process may or may not be reversible.

The successful operation of the present invention as an energy absorber rests on one or more of three interrelated processes - recovery, recrystallisation and grain growth. When crystalline materials plastically deform a proportion of the energy expended in the process appears immediately as heat, but some is stored in the deformed crystals or grains. This stored energy acts as the driving force which tends to return the material to the undeformed state with the release of heat, provided the material is at a temperature where the required reactions — recovery, recrystallisation and/or grain growth — can occur at a useful rate. A torsional extrusion energy absorber requires an extrudable material in which one or more of these processes takes place spontaneously and quickly at the operating temperature of the device so that the mechanical properties of the material are essentially the same over each revolution.

According to this invention the extrudable material is a crystalline substance such as lead, aluminium or ice, or any other substance which at the operating temperature of the absorber is capable of spontaneous recovery and recrystallisation to regain its original mechanical properties so that the absorber exhibits the same characteristics on each cycle of its operation.

In the embodiments described below the extrudable material is lead which has a time constant, depending on conditions, of between 1 and 10 seconds for complete recovery of its original mechanical properties. The greater the rate at which the lead is deformed the faster it will recrystallise. The effect of an increase in temperature is twofold:

a. As the temperature increases the flow stress decreases and therefore the energy absorbed per cycle decreases.

b. The higher the temperature the more rapidly the lead will recover and recrystallise.

These facts mean that the absorber or limiter is a stable device and is not liable to destroy itself. When the embodiment to be described operates in the absorber mode energy of a periodicity of the order of seconds will not cause the heating of the deformable material, in this case lead, to be such as to cause melting, however long the process is continued.

The preferred forms of the invention will now be described in relation to the attached drawings, in which:

FIG. 2 shows a cross-section at A—A in FIG. 1,

FIGS. 2(A) and 2(B) differing in that the shaft has rotated 180°,

FIG. 3 shows a cross-section of a second embodiment.

Figure 4:
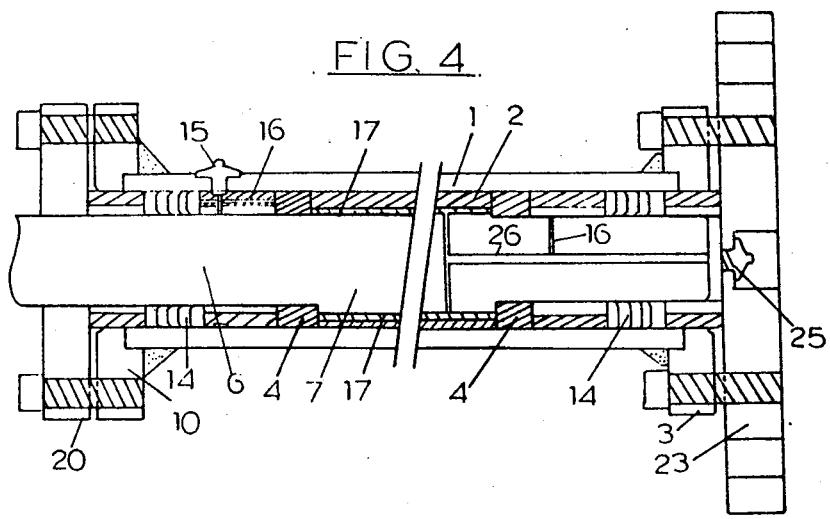
Figure 1:
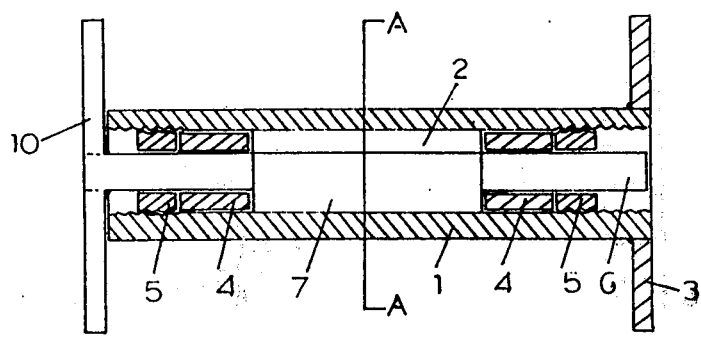
FIG. 1 shows a longitudinal cross-section of the invention in one embodiment.

FIG. 4 shows a longitudinal cross-section corresponding with FIG. 1 but with three developments:
Bearing material is inserted within the lead;
There is an amended arrangement of seals;
The method of lubrication is shown.

In the description which follows where reference is made to lead it is to be understood that other materials may also be effective. In particular, super-plastic materials may be used.

In the invention a thick-walled tube 1 contains a close fitting plug of lead 2. Torque is transmitted to or from tube 1 by a flange 3 which may in one modification be replaced by a lever. The lead plug is restrained axially by the bushes 4 held in place by screw means 5. Central within the lead is a shaft 6, to or from which torque is transmitted by flange 10, which may in one modification be replaced by a lever. Integral with shaft 6 is an eccentric 7 co-extensive axially with the lead plug. Referring now to FIG. 2(A), it will be seen that the gap between eccentric 7 and tube 1 is small at 8 and large at 9. When the shaft 6 has made half a revolution the picture becomes as in FIG. 2(B). The small gap has now moved to 9 and the large gap has moved to 8. In actual fact, the eccentric has been forced through the lead and the lead has flowed out behind the projecting part of the eccentric. This is in essentials the same operation as extrusion wherein the extrusion ratio is the ratio of the largest to the smallest gap between eccentric 7 and tube 1; i.e. in FIG. 2(A) it is the ratio of the dimension of 9 to the dimension of 8. The rotation of the shaft 6 has then the same energy absorbing property as the traverse of a ram in a conventional extruder. The torque needed to force the eccentric 7 through the lead plug 2 is a function which is fixed by the dimensions and properties of the material, in this case lead 2, of the diameter and eccentricity of the eccentric 7 and of the length of the lead plug. The invention will transmit without slip all torques up to this torque. If an attempt is made to transmit a greater torque, the eccentric begins to move with a speed depending on the excess of torque through the lead. For any given circumstances, in particular so long as the lead has not been heated by long continued absorption of energy, the limiting torque is closely reproducible. The energy which is absorbed by the invention must be liberated as heat.

In an alternative form of design, the shaft 6 has no eccentric but the plug of lead is held firmly to the shaft by a plurality of splines. Tube 1 is distorted from the circular cross-section by external pressure into a non-circular cross-section.

Figure 3A:
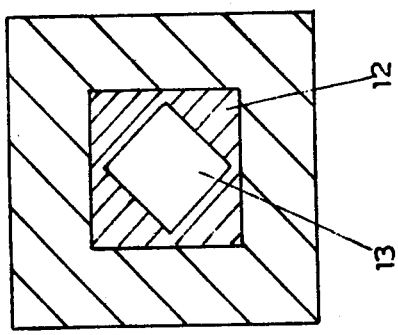
Figure 3B:
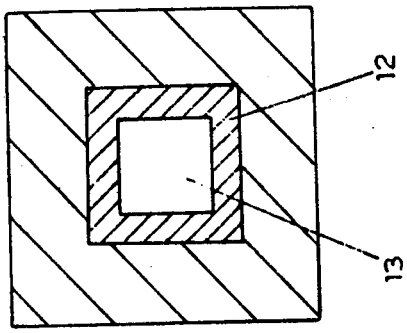

A second possible embodiment is shown in FIG. 3. The circular cross-sections of FIG. 2 have given way to square cross-sections. These in themselves produce eccentrics. It will be obvious that as shaft 13 rotates from the position shown in FIG. 3(A) to that shown in FIG. 3(B) lead 12 must flow past each corner of shaft 13 as it comes closer to the wall of tube 11. In the position shown in FIG. 3(A) the flow of the lead will be least obstructed. In that shown in FIG. 3(B) the flow of the lead will be most obstructed. This variation will occur four times per revolution of the shaft, so giving rise to a bumpy rotation, but at the same time allowing the lead to be well controlled against rotation.

In FIG. 1 lead plugs restrained axially by simple bushes 4 are held in place by screw plugs 5. In FIG. 4 bushes 4 are reinforced by chevron seals 14 held in place by subsidiary flanges 20 and 23 which are screwed on to flanges 10 and 3.

It has been found on test that lubrication is needed between the inner member 7 of the absorber and the lead 2 with which it is in contact. FIG. 4 shows lubricating nipples 15 and 25 which lead a lubricant by passages 16 to the working surfaces of seals 4 and 14 and by passages 26 to the working surface between lead 2 and eccentric 7.

In further tests it was found that the life of the devices was set by the failure of the lubricants, and it was desirable to increase its life. Moreover it was found that the inner member 6 could be rotated for about 10° before torque was developed between the inner 6 and the outer 1 members. For use as a torque limiter so large an angle was a drawback. It was also found during tests at the slow speed of one revolution per four minutes, a speed set by the test gear then available, that the torque at which slip occurred fell markedly in the first 10 to 100 revolutions. This also is a drawback if the device is to be used as a torque limiter.

When the device is operating in the absorber mode, i.e. when lead is being extruded, two relative motions can be distinguished. One is the local circulation of lead during extrusion; this motion is an essential part of the process. The second motion is rotation between the inner eccentric 7 and the main body of lead 2. The amplitude of this, necessary but disadvantageous, motion is far greater than the amplitude of motions within the lead. It can cause an early breakdown of the apparatus. Lubrication is an alleviation but it does not give as long a life as is desirable because the lubrication itself breaks down. In FIG. 4 is shown a further development. 17 is a sleeve of a material which is adapted to act as a bearing on the steel of the inner. It can conveniently be of beryllium bronze or any other bearing material which will not be squeezed out under the high stresses involved.

The interface between sleeve 17 and eccentric 7 is to follow normal bearing practice and will be well lubricated. The surface between sleeve 17 and lead 2 may be treated either as a bearing in which case it may be lubricated or it may be coated with a plastic of low coefficient of friction. If the surface is lubricated the lubricant must be able to withstand the extreme conditions encountered during the extrusion. It should have both hydrodynamic and boundary lubrication properties and it should not interact with the lead.

A high temperature clay filled grease is found to be effective. Similarly a mixture of silicone grease and colloidal graphite is suitable.

Similar considerations apply when no sleeve is used. Alternatively, sleeves 17 may be fixed within lead 2 by knurling or deposition.

When the interspace between eccentric 7 or sleeve 17 and lead 2 is filled with a lubricant or a plastic solid, the extrusion force will be imposed upon the lead by the fluid in the interspace, and not by the metal of the eccentric or the sleeve. The process will be one of hydrostatic extrusion.

Tests using sleeves 17 have shown that the rotation before torque was developed, 10° without the sleeve, fell when using the sleeve to between 1° and 1½°.

The devices heretofore described may be used as:

1. A torque limiter for either continuous rotation or one shot operation which may be uni-directional or bi-directional.

2. As a brake. In this case one of the two flanges 3 or 10 (or 20 or 23) would be bolted to a rotary device to be braked, the other would be furnished with a clutch by which it could be held stationary.

3. If either of the flanges 3 or 10 (or 20 or 23) is replaced by an arm, the device can be used as an oscillatory energy absorber, the direction of supply of the energy then being linear and derived from a coupling to the arm.

4. Modification (3) may be still further modified by incorporating a ratchet which would most simply be interposed between the arm and either tube 1 or shaft 6. The device would then extract energy which was presented in one direction and would allow free movement in the other.

In designing an absorber according to this invention it will be known what torque is the maximum for which the device is to be used. This torque and the area of the bore of the tube give the maximum internal pressure. From this the wall thickness of the tube can be determined, using thick-walled tube theory.

Published tables, related to extrusion, show the relation between maximum internal pressure — otherwise known as "ram pressure" — and the ratio of the area of the tube to the area of constriction, which in the case of FIG. 2 is the ratio of dimension 9 to dimension 8. Such tables can be found in N.E.L. Report No. 2, published by D.S.I.R. of the United Kingdom, June 1961; "The Effect of Ram Speed on the Extrusion of Lead and Aluminium" by K. Ashcroft and G. S. Lawson; and in "The Extrusion of Metals" by Claude E. Pearson, published by John Wiley & Sons, New York, 1944.

In constructing the device the lead plug is turned to fit the tube and is pushed into place. The surface with which the eccentric is to be in contact is prepared by drilling, with a suitable eccentricity, a hole of the diameter of the eccentric.

A dry lubricant has been found unsatisfactory for lubricating the working surfaces. A high pressure - high temperature grease, such as Castrol BNS has been found to be suitable.

What I claim is:

1. A bi-modal device comprising a driven member and a driving member, said driven member being an outer cylinder and said driving member being a shaft extending coaxially through said cylinder for rotation therein, a radially extending projection on a portion of said shaft within said cylinder, seals to confine an annular space between the projection and the cylinder, a crystalline material filling said space, such material being adapted to transform energy to heat continuously by being extrudable and capable of spontaneous recovery and recrystallization at the working temperature of the device, wherein below a predetermined torque applied between the cylinder and the shaft the device rotates in a first mode as a whole, and that above the said predetermined torque the shaft and projection, in a second mode, rotate and extrude the said material, whereby in the second mode the device is an energy absorber, and in the relation between the first and the second mode it is a slipping clutch.

2. A device as claimed in claim 1 wherein the extrudable material is selected from lead, aluminum and ice.

3. A device as claimed in claim 1 wherein at least one of the interfaces of extrudable material with the driven and driving member is lubricated.

4. A device as claimed in claim 1 in which a layer of bearing material is interposed between the extrudable material and one of the driving and driven member.

5. A device as claimed in claim 4 wherein at least one of the bearing surfaces of bearing material is lubricated.

6. A device as claimed in claim 4 wherein the bearing material is attached to the extrudable material.

7. A device as claimed in claim 1 wherein the radially extending projection on the shaft is an eccentric.

8. A method of absorbing torsional energy above a predetermined torque by extruding between an outer cylinder and an eccentric within it a material which is capable of spontaneous recovery and recrystallization at the working temperature.

* * * * *